(No Model.)
A. MILLIKEN.
Button.
No. 234,684. Patented Nov. 23, 1880.
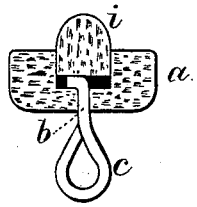
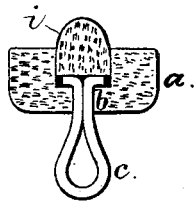 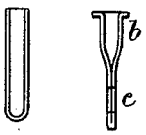 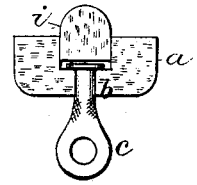
Witnesses
Chas H. Smith
Harold Serrell
Inventor
Alonzo Milliken
per Lemuel W. Serrell
atty

UNITED STATES PATENT OFFICE.

ALONZO MILLIKEN, OF BROOKLYN, NEW YORK.

BUTTON.

SPECIFICATION forming part of Letters Patent No. 234,684, dated November 23, 1880.

Application filed June 25, 1880. (No model.)

*To all whom it may concern:*

Be it known that I, ALONZO MILLIKEN, of Brooklyn, in the county of Kings and State of New York, have invented an Improvement in Buttons, of which the following is a specification.

Pearl and other buttons have been made with metal shanks, and these have usually been attached to a metal disk that has been introduced into a recess and spread out so as to hold the shank to the button, or else the ends of the wire have been spread into a dovetailed recess at the back of the button.

I make use of a button-disk having a hole through it for the reception of the shank and a recess in the face of the button-disk for the reception of a plug or cap-piece that closes the opening at the end of the shank and finishes the surface of the button. The shank is made of a sheet-metal tube closed at one end, similar to a blank-cartridge case. This is flattened at one end and pierced to form the eye, and the open end of the tube is spread to form a flange that secures the shank in the button.

In the drawings, Figure 1 is a section of the button complete. Figs. 2 and 4 represent the button with wire shanks. Figs. 3 and 5 represent the blank for the tubular shank and the shank in section.

The drawings represent buttons of larger size than usually employed.

The button-disk $a$ is to be of mother-of-pearl or other suitable material. A central hole is bored through the same for the stem $b$ of the shank $c$. This shank is preferably made of a sheet-metal tube, as seen in Fig. 3, flattened and perforated to form the eye, as shown in Fig. 1, and sectionally in Fig. 5, and the tubular end is passed into the hole in the button-disk and the end spread to form a shoulder or offset that retains the shank in the button-disk. Sometimes the ordinary wire shank in the form shown in Fig. 2, with the two parts of the wire passed through the hole and the ends spread, may be used, or the wire passing through the hole in the button-disk may be single, as in Fig. 4.

The button-disk is recessed in its face in line with the hole for the shank, and into this recess a plug, $i$, is inserted, which forms the central ornament of the face of the button and closes up the recess that receives the end of the shank. This plug is to be cemented into place. This construction allows for the shank being secured in a very firm manner, and insures a finished appearance to the surface of the button.

I claim as my invention—

1. As an improvement in buttons, the button-disk having a central hole and recess, in combination with the shank, the end of which is spread within the recess, and the plug $i$, introduced into the recess and secured therein, substantially as set forth.

2. The combination, with the button-disk, of a tubular sheet-metal shank, the outer end of which is flattened and perforated to form an eye, and the tubular end that enters the button-disk is spread to secure the parts together, substantially as set forth.

Signed by me this 23d day of June, A. D. 1880.

A. MILLIKEN.

Witnesses:
GEO. T. PINCKNEY,
CHAS. H. SMITH.